US012134329B2

United States Patent
Todeschini (10) Patent No.: US 12,134,329 B2
(45) Date of Patent: Nov. 5, 2024

(54) AUTOMATIC SUPPLY STATION FOR AN AUTONOMOUS AERIAL VEHICLE

(71) Applicant: SAFRAN ELECTRONICS & DEFENSE, Paris (FR)

(72) Inventor: Eric Todeschini, Boulogne-Billancourt (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 265 days.

(21) Appl. No.: 17/641,246

(22) PCT Filed: Sep. 9, 2020

(86) PCT No.: PCT/FR2020/051553
§ 371 (c)(1),
(2) Date: Mar. 8, 2022

(87) PCT Pub. No.: WO2021/048497
PCT Pub. Date: Mar. 18, 2021

(65) Prior Publication Data
US 2022/0340030 A1    Oct. 27, 2022

(30) Foreign Application Priority Data

Sep. 9, 2019  (FR) ..................... 1909909

(51) Int. Cl.
*B60L 53/36* (2019.01)
*B60L 53/18* (2019.01)
(Continued)

(52) U.S. Cl.
CPC ............... *B60L 53/36* (2019.02); *B60L 53/18* (2019.02); *B64C 39/024* (2013.01); *B64D 47/00* (2013.01);
(Continued)

(58) Field of Classification Search
CPC ........ B60L 53/36; B60L 53/18; B64C 39/024; B64D 47/00; B64F 1/22; G05D 1/0202; H02J 7/0042; B64U 2201/10
See application file for complete search history.

(56) References Cited

U.S. PATENT DOCUMENTS

| 2016/0001883 | A1  | 1/2016 | Sanz et al. |
| 2018/0039286 | A1  | 2/2018 | Tirpak et al. |
| 2020/0218288 | A1* | 7/2020 | Johnson ............... G05D 1/0866 |
| 2020/0225684 | A1* | 7/2020 | Anderson ............. B64C 39/024 |

FOREIGN PATENT DOCUMENTS

| EP | 3 326 912 A1 | 5/2018 |
| ES | 2 673 051 A1 | 6/2018 |

(Continued)

OTHER PUBLICATIONS

"Staying Alive: A Docking Station for Autonomous Robot Recharging", by M. Silverman, D. Nies, B. Jung and G. Sukhatme. Proceedings of the 2002 IEEE International Conference on Robotics & Automation Washington, DC, May 2022. pp. 1050-1055. (Year: 2002).*

(Continued)

*Primary Examiner* — Peter D Nolan
*Assistant Examiner* — Tanya C Sienko
(74) *Attorney, Agent, or Firm* — Sughrue Mion, PLLC (57) ABSTRACT

A system for recharging an autonomous aerial vehicle includes a base, a supply boom, a receiving basket, a centering device, and a locking device. The supply boom includes a tip and first recharger. The receiving basket has an inner wall delimiting a cavity that may receive the tip of the supply boom. The receiving basket including a second recharger that is complementary to the first recharger. One of the supply boom and the receiving basket is mounted on the autonomous aerial vehicle while the other is mounted on the base. The centering device centers the tip of the supply boom (Continued)

in the cavity of the receiving basket. The locking device is controlled by a controller and locks the supply boom in the receiving basket.

16 Claims, 3 Drawing Sheets

(51) Int. Cl.
  *B64C 39/02* (2023.01)
  *B64D 47/00* (2006.01)
  *B64F 1/22* (2024.01)
  *G05D 1/00* (2024.01)
  *H02J 7/00* (2006.01)

(52) U.S. Cl.
  CPC ............ *B64F 1/22* (2013.01); *G05D 1/0088* (2013.01); *G05D 1/0202* (2013.01); *H02J 7/0042* (2013.01); *B64U 2201/10* (2023.01)

(56) References Cited

FOREIGN PATENT DOCUMENTS

| KR | 10-2016-0092720 | A | | 8/2016 | |
|----|----|----|----|----|----|
| WO | WO-2015135523 | A1 | * | 9/2015 | ........... G05D 1/0676 |
| WO | 2018/066753 | A1 | | 4/2018 | |
| WO | 2019/125357 | A1 | | 6/2019 | |

OTHER PUBLICATIONS

"An Autonomous Charging System for a Robotic Fish" P. Phamduy, J. Cheong, and M. Porfiri, IEEE/ASME Transactions on Mechatronics, vol. 21, No. 6, Dec. 2016 (Year: 2016).*

"The Power-over-Tether system for powering small UAVs: Tethering-Line Tension Control Synthesis" by L. Zikou, C. Papachristos, and A. Tzes, 2015 23rd Mediterranean Conference on Control and Automation (MED) Jun. 16-19, 2015. Torremolinos, Spain (Year: 2015).*

"Industrial connectors with fail-safe disconnect under cable tension (like MagSafe)" (discussion thread on StackExchange); downloaded from https://electronics.stackexchange.com/questions/58136/industrial-connectors-with-fail-safe-disconnect-under-cable-tension-like-magsaf modified Jun. 11, 2018 (Year: 2018).*

Machine translation of WO2015135523, downloaded from Espacenet Mar. 12, 2024 (Year: 2024).*

International Search Report dated Dec. 4, 2020 from the International Searching Authority in International Application No. PCT/FR2020/051553.

Written Opinion dated Dec. 4, 2020 from the International Searching Authority in International Application No. PCT/FR2020/051553.

French Search Report and Written Opinion dated May 18, 2020 from the French Intellectual Property Office in French Application No. 1909909.

* cited by examiner

AUTOMATIC SUPPLY STATION FOR AN AUTONOMOUS AERIAL VEHICLE

CROSS REFERENCE TO RELATED APPLICATIONS

This application is a National Stage of International Application No. PCT/FR2020/051553 filed Sep. 9, 2020, claiming priority based on French Patent Application No. 1909909 filed Sep. 9, 2019, the entire contents of each of which being herein incorporated by reference in their entireties.

FIELD OF THE INVENTION

The present invention relates to the field of autonomous aerial vehicles, and more particularly the landing and the automatic recharging of such vehicles.

STATE OF THE ART

The autonomous aerial vehicles, such as Vertical Takeoff and Landing Aircrafts, VTOL, have a limited autonomy that does not allow them to carry out long-term missions without being regularly recharged. The battery of these aerial vehicles must therefore be changed regularly or, alternatively, the vehicles must be connected during the mission to one or several recharging stations.

A recharging station has already been proposed for recharging a drone during a mission. For that purpose, the drone is automatically guided towards the recharging station to land there, then it is electrically connected by an operator on the ground by wired or wireless means to the station in order to recharge its battery or batteries. The recharging therefore requires human intervention in order to connect the autonomous vehicle.

In parallel, some autonomous vehicles, particularly VTOLs, are configured to carry out missions in tethered flight mode above the recharging station. During these missions, the drone is hovering above the station in order to serve as an observation point, a communication relay, etc. The recharging stations are then either fixed relative to the ground or mobile and, for example, on board a stationary or slow-moving vehicle such as a boat. In tethered flight mode, the VTOL is at an altitude of a few tens of meters while remaining electrically and mechanically connected to the recharging station via a cable, which allows the VTOL to fly continuously 24 hours a day, 7 days a week.

However, when the VTOL must perform a reconnaissance flight, it is necessary to disconnect it from the recharging station and then reconnect it manually when it returns to the station at the end of the mission.

DISCLOSURE OF THE INVENTION

One aim of the invention is to propose a system for automatically recharging an autonomous aerial vehicle which does not require manual intervention by an operator on the ground and whose bulk and mass do not penalize the aerial vehicle.

To this end, there is proposed, according to a first aspect of the invention, a system for recharging an autonomous aerial vehicle comprising:
 a base,
 a supply boom comprising a tip and first recharging means,
 a receiving basket comprising an inner wall delimiting a cavity configured to receive the tip of the supply boom, said receiving basket comprising second recharging means complementary to the first recharging means,
 one among the supply boom and the receiving basket being mounted on the autonomous aerial vehicle while the other among the boom and the basket is mounted on the base, and
 means for centering the tip of the supply boom in the cavity of the receiving basket. Some preferred but non-limiting characteristics of the system according to the first aspect are the following, taken individually or in combination:
 the centering means are formed in whole or in part by the tip of the supply boom and/or by the inner wall of the receiving basket.
 all or part of the tip of the supply boom has a substantially convergent shape and/or all or part of the inner wall of the receiving basket has a substantially divergent shape, typically conical and/or frustoconical shapes.
 the supply boom is mounted on the base or on the autonomous aerial vehicle via at least one flexible element, preferably a set of springs.
 the system further comprises a device for mechanically locking the supply boom in the receiving basket, said locking device being controlled by a controller.
 the mechanical locking device comprises clamping jaws.
 the second recharging means are mounted on the mechanical locking device and/or on the inner wall of the receiving basket.
 the system further comprises at least one presence sensor mounted on the autonomous aerial vehicle and/or on the base and configured to generate a signal when the supply boom is housed in the receiving basket, the controller being configured to lock the locking means as a function of the signal generated by said presence sensor.
 the supply boom is mounted on the base via a cable, said base further comprising a winder configured to wind and unwind the cable automatically, and/or
 the system further comprises a safety device comprising either a tension sensor configured to detect a tension applied to the cable or a pressure limiter mounted on the locking device, the controller being configured to control the locking means as a function of a value of the tension measured by the tension sensor or of the pressure measured by the pressure limiter.

According to a second aspect, the invention also proposes a method for automatically recharging an autonomous aerial vehicle using a recharging system as described above, the method comprising the following steps:
 S1: guidance of an autonomous aerial vehicle to the base
 S2: positioning of the autonomous aerial vehicle vertically above the base, so that the supply boom is located substantially in front of the receiving basket
 S3: centering of the tip of the supply boom relative to the cavity of the receiving basket and landing of the autonomous vehicle on the base, the supply boom gradually entering the receiving basket, and
 S4: electrical connection of the autonomous aerial vehicle to the base by connection of the first recharging means with the second recharging means.

Some preferred but non-limiting characteristics of the method according to the second aspect are the following, taken individually or in combination:
 the supply boom is mounted on the base via a cable, said base further comprising a winder configured to wind and unwind the cable automatically, the method further comprising the following steps, prior to step S1:

S10: locking of the supply boom in the receiving basket

S11: unwinding of the cable to allow the autonomous aerial vehicle to fly over the base in tethered flight mode S13: release of the supply boom from the receiving basket S14: winding of the cable to bring the supply boom back on the base.

step S13 is initiated when a tension of the cable and/or a locking pressure are greater than a predetermined threshold is detected.

DESCRIPTION OF THE FIGURES

Other characteristics, aims and advantages of the invention will emerge from the following description, which is purely illustrative and not limiting, and which must be read in relation to the appended drawings in which.

In all the figures, similar elements bear identical references.

DETAILED DESCRIPTION OF THE INVENTION

In a manner known per se, an autonomous aerial vehicle 2 comprises:
- a frame 3 carrying one or several propellers actuated by one or several respective motors,
- guide means 4 of the GPS type (for Global Positioning System),
- a computer 5,
- one or several batteries 6 connected to a power supply system 7 for the aerial vehicle 2,
- means for communication 8 with a ground station, typically a radio frequency interface,
- an inertial navigation system 9 of the inertial unit and barometer type,
- optionally, one or several video camera(s) 10 mounted on the frame 3 so as to be pointed to the ground when the autonomous aerial vehicle 2 is in operation, typically in flight,
- optionally, a rangefinder 11, typically ultrasonic rangefinder, mounted on the frame 3 so as to be pointed to the ground when the autonomous aerial vehicle 2 is in operation.

System for Automatically Recharging a Drone 2 Using the Recharging System 1

In the following, the invention will be described more particularly in the case of an autonomous aerial vehicle 2 of the drone type, typically a VTOL. This is however not limiting, the invention applying mutatis mutandis to any autonomous aerial vehicle such as, but not exclusively, a crew drone, a taxi drone or a packing drone (deposit and delivery of packages).

In order to allow the automatic recharging of an autonomous aerial vehicle 2, for example of a drone 2, not requiring the intervention of an operator on the ground, the invention proposes a recharging system 1 comprising:
- a recharging base 20,
- a supply boom 21 comprising a body 22 and a tip 23 and first recharging means 24,
- a receiving basket 12 comprising an inner wall 13 delimiting a cavity 14 configured to receive the tip 23 of the supply boom 21 and second recharging means 15, and
- means for centering 23, 13 the supply boom 21 in the cavity 14 of the receiving basket 12.

One among the supply boom 21 and the receiving basket 12 is mounted on the base 20 while the other is mounted on the drone 2. In one embodiment, the supply boom 21 is mounted on the base 20 in order to reduce the bulk of the recharging system 1 within the drone 2. In this embodiment, the receiving basket 12 is then mounted on the drone 2. Alternatively, the supply boom 21 can however be mounted on the drone 2, in which case the supply basket is mounted on the base 20.

In the following, and for the sake of simplification of the description, the invention will be described in the case where the supply boom 21 is mounted on the base 20 while the receiving basket 12 is mounted on the drone 2, without it being limiting.

In one embodiment, the centering means 23, 13 are formed in whole or in part by the tip 23 of the supply boom 21 and/or by the inner wall 13 of the receiving basket 12. More specifically, all or part of the tip 23 has a substantially convergent shape and/or all or part of the inner wall 13 has a substantially divergent shape which can be complementary to that of the tip 23, in order to allow the progressive guidance of the tip 23 in the cavity 14 during their coupling. For example, the tip 23 and the inner wall 13 can have a substantially conical or frustoconical shape. It will be noted that, in one variant, only the tip 23 or the wall can have such a conical or frustoconical shape, respectively, in order to form the centering means 23, 13, the other one may be of any shape, for example cylindrical or cylindrical of revolution.

In the example illustrated in the figures, the entire inner wall 13 delimiting the cavity 14 of the tip 23 has a conical shape while the tip 23 has a frustoconical shape. Alternatively, the inner wall 13 could have a conical or frustoconical-shaped bottom and a mouth of any shape, while the tip 23 is of frustoconical or conical shape and configured to penetrate into the cavity 14 and the body 22 is of any shape or of a shape complementary to that of the mouth.

In order to further facilitate the centering of the tip 23 in the cavity 14, the supply boom 21 is mounted on the base 20 via at least one flexible element 25, 26 such as one or several springs. The holding of the tip 23 on the base 20 is therefore flexible, which facilitates its insertion into the cavity 14 during the coupling of the base 20 with the drone 2 by increasing the tolerance on the centering of the tip 23 in the cavity 14.

For example, the base 20 can comprise a sheath configured to receive all or part of the body 22 of the supply boom 21 so that the tip 23 of the supply boom 21 protrudes from the sheath and, more generally, from the base 20. The sheath is then itself placed in a chamber formed in the base 20 and held in position in this chamber via the spring(s) 25. Typically, the sheath can be held in suspension by one or several pairs of springs 25 placed two by two on either side of the sheath. The choice of the stiffness of each spring 25, the number of spring(s) and the positioning of each spring relative to the sheath allows adjusting the flexibility of the link between the sheath (and therefore the supply boom 21) and the base 20.

Optionally, the sheath comprises or between a compressible element 26 (compression spring, foam, etc.) housed at the bottom of the sheath and configured to come into contact with the body 22 of the supply boom 21 when it is placed in the sheath. During the coupling of the supply boom 21 with the receiving basket 12, the compressible element 26 thus allows increasing the positioning tolerance of the drone 2 relative to the base 20 by allowing vertical displacement (axis Z) of the supply boom 21. Thus, the set of springs 25 increases the positioning tolerance in the horizontal plane (X, Y) (generally parallel to the ground) while the compressible element 26 increases the positioning tolerance following the vertical axis.

The end of the body 22 of the supply boom 21 which is opposite to the tip 23 (and, where appropriate, comes into contact with the compressible element 26) can have a reduced section in order to facilitate the introduction of the supply boom 21 in the sheath. For example, this end can be substantially frustoconical or hemispherical. Optionally, the recharging system 1 further comprises a device for locking 27 the supply boom 21 in the receiving basket 12 in order to ensure the electrical connection between the first and second recharging means 15. This locking device 27 is controlled by a controller 18, which can be placed at the base 20, mounted on the drone 2 or placed at a distance from the base 20 and the drone 2, for example at the level of a ground station separate from the base 20. For example, the controller 18 can be integrated into the computer 5 of the drone 2.

In one embodiment, the locking device 27 comprises clamping jaws 28 configured to come into engagement with one or several complementary supports 29 to block the supply boom 21 in position in the cavity 14. The clamping jaws 28 can in particular be actuated by respective motors. Where appropriate, each jaw 28 is mounted on the output shaft of a corresponding motor, typically a linear servomotor and electromagnets, via a compression spring configured to apply said jaw 28 against the facing support 29 and thus make the link between the tip 23 and the receiving basket 12 flexible.

The clamping jaws 28 can be mounted on the supply boom 21 or in the cavity 14 of the receiving basket 12, the complementary supports 29 being mounted on the complementary part. Preferably, the jaws 28 are mounted on the inner wall 13, in the cavity 14 of the receiving basket 12, and the complementary supports 29 are mounted on the body 22 of the tip 23.

In one variant not illustrated in the figures, the locking device 27 is placed at the feet 16 of the drone 2 and/or on the base 20, in one area located facing the feet 16 when the tip 23 is positioned in the cavity 14 of the receiving basket 12. In this way, when the drone 2 is laid on the base 20, the locking device 27 blocks the feet 16 of the drone 2 and thus holds it in position relative to the base 20.

The first and second recharging means 15, 24 can in particular comprise electrical contacts, electrical sockets, inductive recharging coils, or any other suitable electrical connection means.

The first recharging means 24 can for example be placed on the portions of the tip 23 which come into contact with the inner wall 13 of the cavity 14 and/or, where appropriate, on the supports 29 which come into contact with the clamping jaws 28, while the second recharging means 15 are placed in the areas facing the receiving basket 12, typically at the conical (or frustoconical) part of the inner wall 13 and/or, where appropriate, the clamping jaws 28. For example, in the case of recharging means 15, 24 comprising electrical contacts, the electrical contacts corresponding to mass can be placed on the conical (or frustoconical) surfaces of the tip 23 and of the inner wall 13 of the cavity 14 while the electrical contacts corresponding to the power supply 7 are placed on the supports 29 and in the clamping jaws 28.

In one variant embodiment not illustrated in the figures, the recharging means 15, 24 are placed on the one hand at the feet 16 of the drone 2 and on the other hand on the surface of the base 20, in one area located facing the feet 16 when the tip 23 is positioned in the cavity 14 of the receiving basket 12. Where appropriate, the recharging means can be located at the locking device 27 if the latter is at the feet 16 of the drone 2 and/or at the base 20.

The control of the locking device 27 by the controller 18 can be triggered automatically or manually.

For that purpose, in a first embodiment, the recharging system 1 comprises a presence sensor 17 mounted on the drone 2 and/or on the base 20. For example, the presence sensor 17 can be placed in the vicinity of the supply boom 21 and/or of the receiving basket 12 and be configured to generate a signal when the supply boom 21 is detected in the receiving basket 12. The presence sensor 17 can in particular comprise an optical fork configured to generate a signal (tension) upon detection of the supply boom 21 in the cavity 14, or vice versa. The presence sensor 17 can particularly be adjusted such that such a signal is generated when the tip 23 is centered and in the locking position in the cavity 14 of the receiving basket 12. The controller 18 is then configured to lock the locking means upon receipt of this presence signal. This embodiment thus allows automatically locking the supply boom 21 in the receiving basket 12, when the tip 23 is in position in the cavity 14.

In a second embodiment, the controller 18 can be controlled remotely from a ground station, for example by an operator. Particularly, when the drone 2 is in position on the base 20 and when the supply boom 21 is placed in the cavity 14 of the receiving basket 12, the operator can control the controller 18 so that it actuates the locking means.

An autonomous aerial vehicle 2, and particularly a drone 2 of the VTOL type, can have in particular three operating modes: the recharging mode on the base 20, the tethered flight mode and the autonomous mode.

In tethered flight mode, the drone 2 is hovering above the base 20. In order to allow the drone 2 to stay in this mode for longer than its autonomy without having to land on the base 20 in order to be recharged, the supply boom 21 is connected to the base 20 via a cable 19 which can be unwound and wound automatically in order to adjust the length of the cable 19 to the altitude required for the mission. For that purpose, the cable 19 is mounted on a winder 30 housed in the base 20 which is actuated, for the winding and unwinding of the cable 19, by a dedicated motor 31.

Where appropriate, the cable 19 can further be used to allow PLC communication between the drone 2 and the base 20, without passing through the communication interface. The data exchanges are therefore more discreet.

When the drone 2 must switch to autonomous mode in order to carry out a mission remotely from the base 20, the controller 18 can automatically release the supply boom 21 by controlling the unlocking of the locking device 27. The supply boom 21 then falls to the ground or on the base 20, which allows the drone 2 to move away from the base 20 and to carry out its mission autonomously. The winder 30 can then automatically wind the cable 19 to bring the boom back into its sheath, with a view to a future electrical connection of the drone 2. Optionally, the base 20 further comprises a detector positioned at the sheath or in said sheath and configured to detect that the supply boom 21 is correctly introduced into the sheath in order to allow the automatic stopping of the winder 30.

Once the mission has been performed, the drone 2 is positioned above the base 20 so as to substantially align the supply boom 21 with the receiving basket 12, then lands thereon, which has the effect of putting the first and second recharging means 15 into contact with each other. Where appropriate, the controller 18 can lock the locking device 27. The procedure for coupling the drone 2 with the base 20 will be further detailed in the following.

Optionally, the base 20 further comprises a safety device 32 configured to unlock the safety system 31 and release the drone 2 when it is in tethered flight mode, to prevent it from remaining attached to the base 20 and being damaged in hostile conditions, for example in the event of strong gusts of wind.

Figure 1:
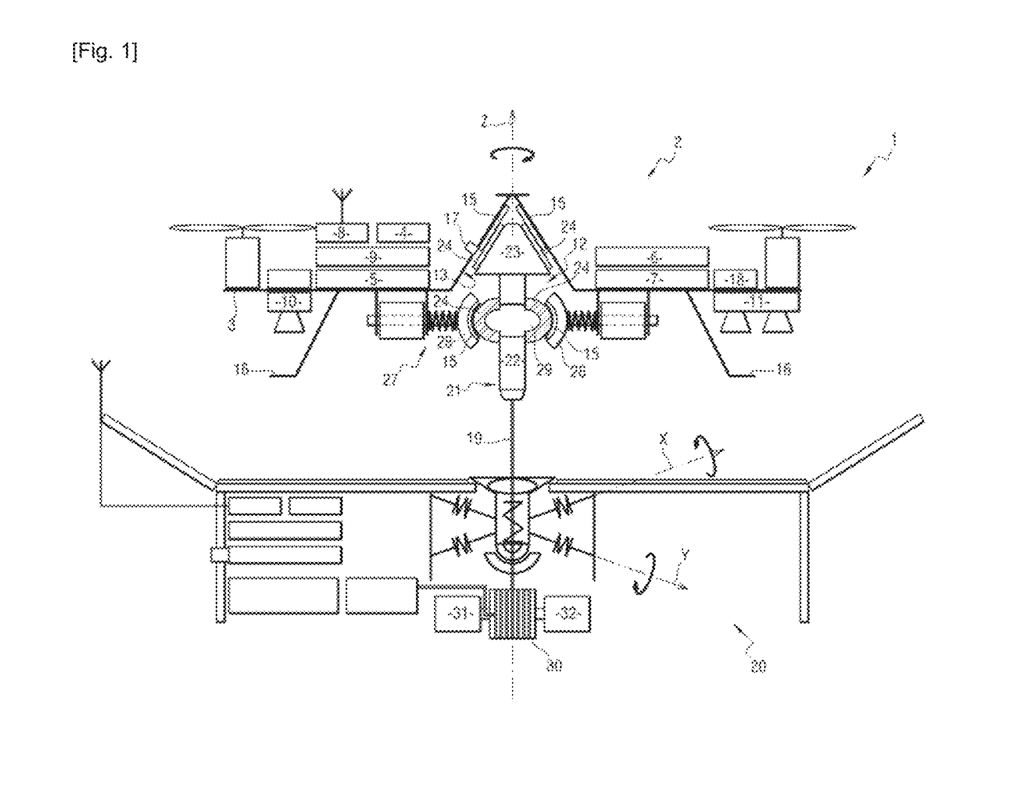
FIG. 1 schematically illustrates a system for automatically recharging an autonomous aerial vehicle according to one embodiment of the invention, the autonomous aerial vehicle being in tethered flight mode.
Figure 2:
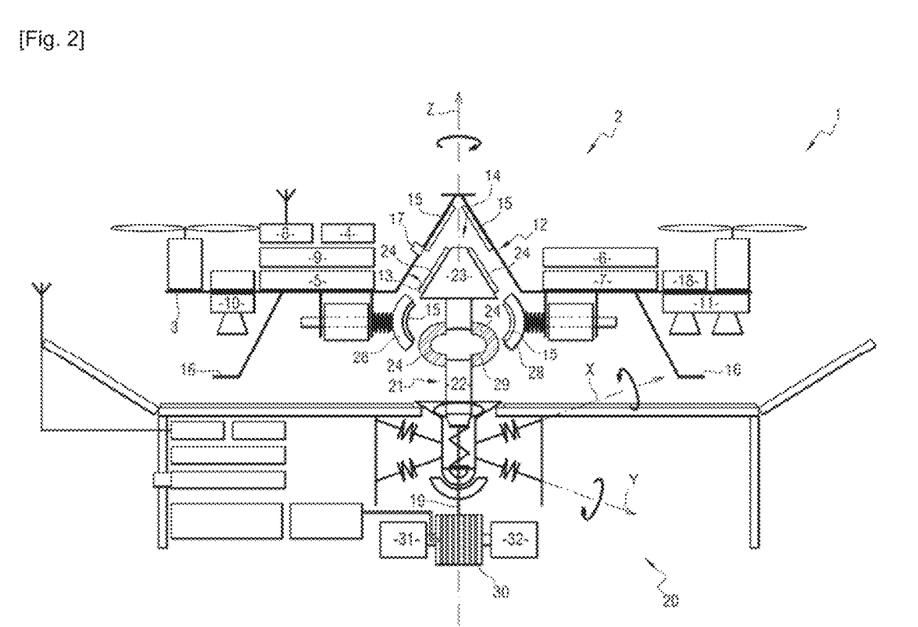
FIG. 2 schematically illustrates the system for automatically recharging an autonomous aerial vehicle of FIG. 1, the autonomous aerial vehicle being about to electrically connect to the base.

The safety device 32 can in particular comprise a tension sensor 32 (as illustrated in FIGS. 1 and 2) for the cable 19 (as illustrated in FIGS. 1 and 2) configured to determine a tension applied to the cable 19 or, alternatively, a pressure limiter placed at the locking means, typically at the clamping jaws 28. The safety device 32 is connected to the controller 18 so that, when the tension of the cable 19 or the pressure applied to the jaws 28 exceeds a predetermined threshold, the controller 18 controls the locking device 27 in order to unlock it to release the drone 2. The supply boom 21 then falls back to the ground or on the base 20, which allows the drone 2 to move away from the base 20. The winder 30 can then automatically wind the cable 19 to bring the boom back into its sheath, with a view to a future electrical connection of the drone 2.

Of course, in the case where the supply boom 21 is mounted on the drone 2, the receiving basket 12 being mounted on the base 20, the winder 30, its motor 31 and the safety device 32 are mounted in the drone 2.

Method for Automatically Recharging S a Drone 2 Using the Recharging System 1

The automatic recharging of a drone 2 of an automatic recharging system 1 in accordance with the invention can be carried out in accordance with the following steps.

Beforehand, it will be noted that the supply boom 21 is in the retracted position, that is to say housed in the sheath of the base 20, the cable 19 being wound on the winder 30. Its tip 23 however protrudes from the sheath in order to allow its coupling with the receiving basket 12 of the drone 2.

Figure 3:
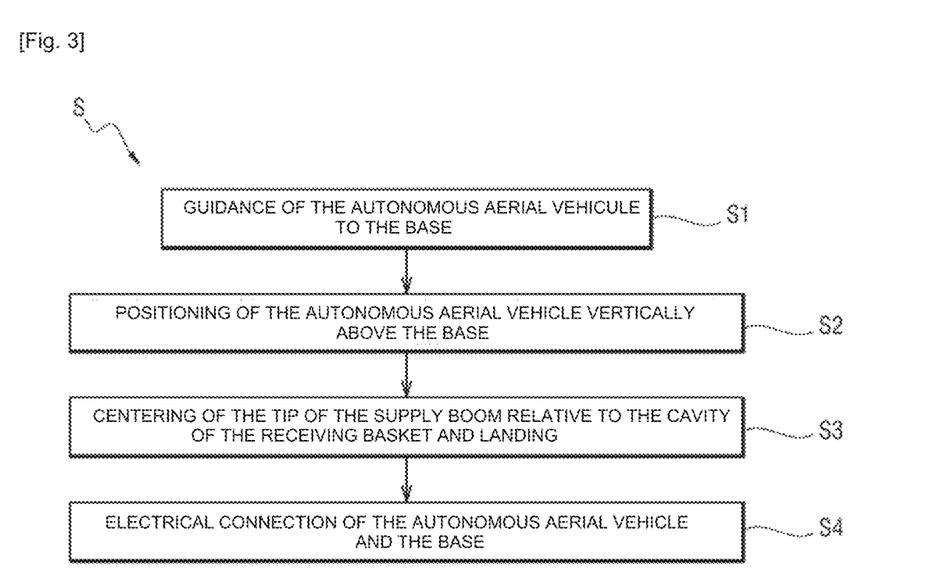
FIG. 3 is a flowchart of steps of a method for automatically recharging an autonomous aerial vehicle in recharging mode according to one embodiment of the invention.

During a step S1, the drone 2 is guided up to the base 20, for example using its guide means 4 (GPS type) and/or its inertial navigation system 9, 10.

During a step S2 (FIG. 2), the drone 2 is positioned vertically above the base 20 so that the supply boom 21 is substantially facing the receiving basket 12.

The accuracy of the guidance by the current guide means 4 and/or the inertial navigation system 9 being generally comprised between one meter and around ten meters, this guidance alone is currently not sufficient to place the drone 2 on the base 20. Conventionally, following the guidance step S1, an alignment system-1 can therefore be used to align the drone 2 and the base 20 with a view to landing the drone 2 automatically on the base 20 by aligning the supply boom 21 with the receiving basket 12. In one embodiment, the alignment system is an optical system comprising the video camera(s) 10, the rangefinder 11 and the inertial navigation system 9. The base 20 comprises moreover one or several known geometric patterns fixed on its surface. The video camera 10 of the drone 2 then captures images comprising these patterns and sends them to the computer 5 which, by correlation with images recorded in its memory, deduces therefrom the position of the drone 2 relative to the base 20 and guides it until the drone 2 is substantially aligned with the base 20 and the supply boom 21 is substantially vertical to the receiving basket 12 (following the Z axis).

This alignment step S2 being conventional, it will not be further detailed here.

The alignment accuracy using an optical alignment system 1 between the base 20 and the drone 2, and more specifically between the supply boom 21 and the receiving basket 12, is on the order of two centimeters.

During a step S3, the tip 23 of the supply boom 21 is centered relative to the cavity 14 of the receiving basket 12 and the drone 2 lands on the base 20 so that the supply boom 21 gradually enters the receiving basket 12.

When the function of the centering means 23, 13 is performed by the (conical or frustoconical, for example) shape of the tip 23 and/or of the inner wall 13, step S3 is carried out mechanically during the landing of the drone 2 on the base 20. Indeed, it is recalled that the drone 2 is generally positioned so that the supply boom 21 is substantially vertical to the receiving basket 12. During the landing of the drone 2, the supply boom 21 therefore gradually penetrates into the cavity 14 of the receiving basket 12 during the final approach of the drone 2 thanks to the guidance of the conical/frustoconical parts of the tip 23 and/or of the inner wall 13 of the receiving basket 12. This penetration can, where appropriate, be facilitated by the flexible link between the sheath and the base 20 (compressible element 26 and/or set of springs), which increases the alignment tolerance between the supply boom 21 and the receiving basket 12 of about one to three centimeters.

Figure 4:
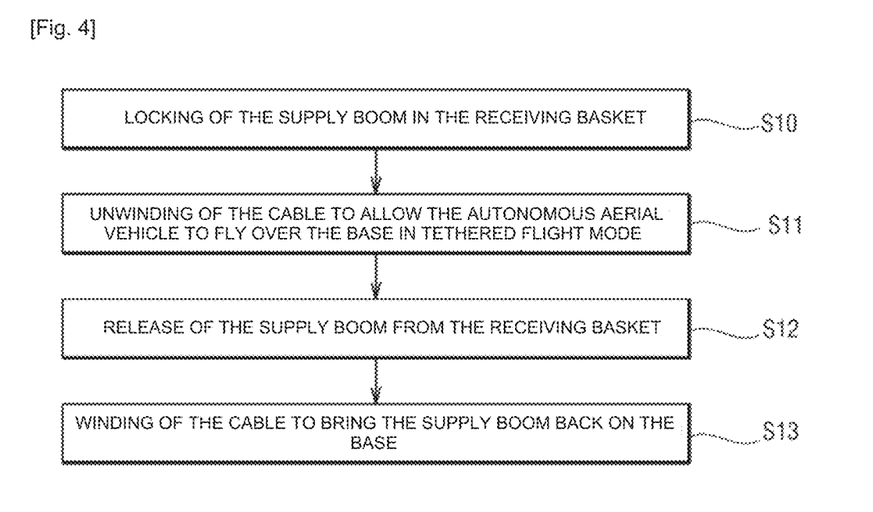
FIG. 4 is a flowchart of steps of a method for automatically recharging an autonomous aerial vehicle in tethered flight mode according to one embodiment of the invention.

Optionally, during a step S10, the drone 2 can be locked on the base 20, automatically or manually.

For that purpose, when the recharging system 1 comprises a locking device 27, typically clamping jaws 28, the controller 18 controls the engagement of the jaws 28 of the receiving basket 12 against the supports 29 of the supply boom 21 following step S3. The detection of the supply boom 21 in the receiving basket 12 can be performed either by the presence sensor 17, in which case the locking of the drone 2 on the base 20 can be automatic, or by an operator.

During a step S4 (FIG. 1), the drone 2 is electrically connected to the base 20 by connection of the first recharging means 24 with the second recharging means 15. In the case where the recharging means are placed at the feet 16 of the drone 2 (respectively, on the surface of the base 20) or on the inner wall 13 (respectively, on the supply boom 21), the electrical connection is carried out at the time of landing of the drone 2 and of the mechanical coupling of the supply boom 21 with the receiving basket 12.

Where appropriate, when at least part of the recharging means are carried by the locking device 27, the electrical connection is also carried out during the locking of the locking device 27.

The drone 2 is then in recharging mode, that is to say laid on the base 20 and electrically connected thereto in order to recharge its battery or batteries 6.

When the drone 2 must switch to tethered flight mode, during a step S11, the cable 19 is unwound gradually in order to allow the drone 2 to fly over the base 20.

The unwinding of the cable 19 can be carried out by the drone 2 itself by applying to the cable 19 a tension greater than a resistance tension of the winder 30 and lower than the predetermined safety threshold of the winder 30, or alternatively by the winder 30 itself on instructions from the computer 5 of the drone 2 or from the ground station.

The unwound length of the cable 19 substantially corresponds to the altitude of the drone 2 during the mission in tethered flight mode.

Where appropriate, in the event of gusts of wind or any other event having the effect of moving the drone 2 in an uncontrolled manner relative to the base 20, during a step S13, the safety device 32 sends a signal to the controller 18 so that it unlocks the locking device 27. The supply boom 21 then falls to the ground or on the base 20, which releases the drone 2 and allows it to move away from the base 20.

During a step S14, the winder 30 winds the cable 19 to bring the supply boom 21 back into its sheath. The introduction of the supply boom 21 into the sheath can in particular be facilitated by the reduced section of the end of the body 22 of the boom.

Step S14 can be triggered automatically or manually.

For example, when the safety device 32 comprises a tension sensor 32 of the cable 19 or a pressure limiter, said device can also be configured to detect the coupling fault between the supply boom 21 and the receiving basket 12. The coupling fault signal can then be communicated, for example, to a dedicated controller 18 which controls the winding of the cable 19. Optionally, the controller 18 stops the winding of the cable 19 when the dedicated detector detects that the supply boom 21 is in the sheath. Alternatively, the winding of the cable 19 can be controlled remotely by an operator.

The invention claimed is:

1. A system for recharging an autonomous aerial vehicle, the system comprising:
    a base,
    a supply boom comprising a tip and first recharging means,
    a receiving basket comprising an inner wall delimiting a cavity configured to receive the tip of the supply boom, said receiving basket comprising second recharging means complementary to the first recharging means,
    one among the supply boom and the receiving basket being mounted on the autonomous aerial vehicle while the other among the supply boom and the basket is mounted on the base,
    centering means for centering the tip of the supply boom in the cavity of the receiving basket, and
    a locking device comprising clamping jaws configured to mechanically lock the supply boom in the receiving basket, said locking device being controlled by a controller.

2. The system according to claim 1, wherein the centering means are formed in whole or in part by the tip of the supply boom and/or by the inner wall of the receiving basket.

3. The system according to claim 1, wherein all or part of the tip of the supply boom has a convergent shape and/or all or part of the inner wall of the receiving basket has a divergent shape.

4. The system according to claim 3, wherein the divergent shape is a conical shape or a frustoconical shape.

5. The system according to claim 1, wherein the supply boom is mounted on the base or on the autonomous aerial vehicle via at least one flexible element.

6. The system according to claim 5, wherein the at least one flexible element comprises a set of springs.

7. The system according to claim 1, wherein the second recharging means are mounted on the locking device and/or on the inner wall of the receiving basket.

8. The system according to claim 1, further comprising at least one presence sensor mounted on the autonomous aerial vehicle and/or on the base and configured to generate a signal when the supply boom is housed in the receiving basket, the controller being configured to lock the locking device as a function of the signal generated by the at least one presence sensor.

9. The system according to claim 1, wherein the supply boom is mounted on the base via a cable, said base further comprising a winder configured to wind and unwind the cable automatically.

10. The system according to claim 1, further comprising a safety device comprising either a tension sensor configured to detect a tension applied to a cable or a pressure limiter mounted on the locking device, the controller being configured to control the locking device as a function of a value of the tension measured by the tension sensor or of a pressure measured by the pressure limiter.

11. A method for automatically recharging the autonomous aerial vehicle using the system according to claim 1, wherein the supply boom is mounted on the base via a cable, said base further comprising a winder configured to wind and unwind the cable automatically, the method comprising the following steps:
    mechanically locking the supply boom in the receiving basket with clamping jaws;
    unwinding of the cable to allow the autonomous aerial vehicle to fly over the base in a tethered flight mode;
    releasing the supply boom from the receiving basket;
    winding of the cable to bring the supply boom back on the base
    guidance of the autonomous aerial vehicle to the base;
    positioning of the autonomous aerial vehicle vertically above the base, so that the supply boom is located in front of the receiving basket;
    centering of the tip of the supply boom relative to the cavity of the receiving basket and landing of the autonomous vehicle on the base, the supply boom entering the receiving basket; and
    electrically connecting the autonomous aerial vehicle to the base by connection of the first recharging means with the second recharging means.

12. The method according to claim 11, wherein the releasing the supply boom from the receiving basket is initiated when a tension of the cable and/or a locking pressure are greater than a predetermined threshold.

13. The method according to claim 11, wherein the receiving basket receives the supply boom along a Z axis, and
    wherein the clamping jaws of the locking device engage with one or more supports along an axis perpendicular to the Z axis.

14. The system according to claim 1, the receiving basket is configured to receive the tip of the supply boom along a Z axis, and
    wherein the clamping jaws of the locking device are configured to engage with one or more supports along an axis perpendicular to the Z axis to mechanically lock the supply boom in the receiving basket.

15. A system comprising:
    an autonomous aerial vehicle having mounted thereon one among a supply boom and a receiving basket; and
    a base having mounted thereon the other one among the supply boom and the receiving basket, wherein the supply boom comprises a tip and first electrical connector, wherein the receiving basket comprises a second electrical connector and has an inner wall delimiting a cavity for receiving the tip of the supply boom, wherein the tip and the inner wall are configured to center the supply boom in the cavity of the receiving basket, and wherein the system further comprises:

a locking device mounted on the supply boom or the receiving basket, the locking device comprising clamping jaws configured to mechanically lock the supply boom in the receiving basket; and a controller configured to control the locking device.

16. The system according to claim 15, the receiving basket is configured to receive the tip of the supply boom along a Z axis, and wherein the clamping jaws of the locking device are configured to engage with one or more supports along an axis perpendicular to the Z axis to mechanically lock the supply boom in the receiving basket.

* * * * *